United States Patent
Fleming

(10) Patent No.: US 6,772,627 B2
(45) Date of Patent: Aug. 10, 2004

(54) FLOW VECTOR ANALYZER FOR FLOW BENCH

(76) Inventor: Ronald J. Fleming, 3290 E. 48$^{th}$ St., Indianapolis, IN (US) 46205

( * ) Notice: Subject to any disclaimer, the term of this patent is extended or adjusted under 35 U.S.C. 154(b) by 0 days.

(21) Appl. No.: 10/397,602

(22) Filed: Mar. 26, 2003

(65) Prior Publication Data

US 2003/0209084 A1 Nov. 13, 2003

Related U.S. Application Data

(60) Provisional application No. 60/367,972, filed on Mar. 26, 2002, and provisional application No. 60/426,960, filed on Nov. 15, 2002.

(51) Int. Cl.$^7$ ............................................... G01M 9/02
(52) U.S. Cl. ...................... 73/147; 73/148; 73/170.07; 73/170.09; 73/170.11; 73/861.66
(58) Field of Search ............................. 73/147, 148.1, 73/70.01, 170.04, 170.06, 170.07, 170.08, 170.09, 170.11, 861.66

(56) References Cited

U.S. PATENT DOCUMENTS

| | | | |
|---|---|---|---|
| 1,645,449 A | * 10/1927 | Proebstel ................. | 73/861.66 |
| 1,811,364 A | * 6/1931 | Olshevsky .................... | 73/147 |
| 1,940,790 A | * 12/1933 | Diehl ........................... | 138/44 |
| 2,390,252 A | 12/1945 | Hayward ....................... | 73/38 |
| 2,448,966 A | * 9/1948 | Fales ............................ | 73/147 |
| 2,603,695 A | * 7/1952 | Campbell ..................... | 73/147 |
| 2,714,819 A | * 8/1955 | Clark ............................ | 73/147 |
| 2,788,861 A | * 4/1957 | Post et al. .................... | 73/147 |
| 2,790,320 A | 4/1957 | Salko et al. ................. | 73/1.26 |
| 2,914,941 A | * 12/1959 | Frenzl .......................... | 73/147 |
| 3,055,212 A | * 9/1962 | Mackey ....................... | 73/147 |
| 3,111,842 A | * 11/1963 | Fredette et al. ............... | 73/147 |
| 3,111,843 A | * 11/1963 | Fredette ....................... | 73/147 |
| 3,403,277 A | * 9/1968 | Way et al. .................... | 73/147 |
| 3,484,953 A | * 12/1969 | Norheim, Jr. ................ | 73/147 |
| 3,875,955 A | 4/1975 | Gallatin et al. ............... | 137/14 |
| 4,063,449 A | 12/1977 | Griggs ........................ | 73/37.5 |
| 4,213,327 A | 7/1980 | Prescott, Jr. et al. ............ | 73/38 |
| 4,372,157 A | 2/1983 | Caruthers et al. ............. | 73/147 |
| 4,422,333 A | 12/1983 | Leon ........................... | 73/660 |
| 4,799,511 A | 1/1989 | Azimov ...................... | 137/613 |
| 4,812,050 A | 3/1989 | Epstein et al. ................. | 374/1 |
| 5,117,687 A | 6/1992 | Gerardi ................... | 73/170.15 |
| 5,136,881 A | 8/1992 | Kendall, Jr. ................. | 73/147 |
| 5,178,003 A | 1/1993 | Wesorick ................... | 73/118.1 |
| 5,187,937 A | 2/1993 | Stevens et al. ............... | 60/752 |
| 5,195,046 A | 3/1993 | Gerardi et al. ............... | 702/35 |
| 5,238,030 A | 8/1993 | Miller et al. .................. | 141/4 |
| 5,259,424 A | 11/1993 | Miller et al. .................. | 141/4 |
| 5,341,676 A | 8/1994 | Gouterman et al. .......... | 73/147 |
| 5,479,818 A | 1/1996 | Walter et al. ................. | 73/116 |
| 5,541,857 A | 7/1996 | Walter et al. ............... | 700/280 |
| 5,557,050 A | 9/1996 | Campain et al. ......... | 73/861.02 |

(List continued on next page.)

FOREIGN PATENT DOCUMENTS

| | | |
|---|---|---|
| GB | 388265 | 2/1993 |
| WO | WO 95/32405 A1 | 11/1995 |
| WO | WO 01/06216 A1 | 1/2001 |

*Primary Examiner*—Hezron Williams
*Assistant Examiner*—David A. Rogers
(74) *Attorney, Agent, or Firm*—Woodard, Emhardt, Moriarty, McNett & Henry LLP

(57) ABSTRACT

Apparatus and methods for airflow testing, especially for air testing of gas turbine components on an airflow test bench. Various embodiments of the present invention include the use of a measurement section downstream of the component being tested. The measurement section, in one embodiment, includes apparatus for measurement of gas properties at a plurality of spaced-apart radial locations and/or a plurality of spaced-apart circumferential locations. In another embodiment, the invention includes a method for testing a component including a comparison of gas properties measured in both forward and reverse flow directions.

40 Claims, 6 Drawing Sheets

U.S. PATENT DOCUMENTS

| | | | |
|---|---|---|---|
| 5,575,616 A | 11/1996 | Hagle et al. | 415/115 |
| 5,594,665 A | 1/1997 | Walter et al. | 700/301 |
| 5,689,066 A | 11/1997 | Stevenson | 73/118.1 |
| 5,895,857 A | 4/1999 | Robinson et al. | 73/660 |
| 5,913,249 A | 6/1999 | Weckstrom | 73/861.52 |
| 5,942,678 A | 8/1999 | Wettstein | 73/40.7 |
| 5,942,690 A | 8/1999 | Shvetsky | 73/660 |
| 6,032,545 A | 3/2000 | Carpenter et al. | 73/865.9 |
| 6,148,677 A | 11/2000 | Evangelista | 73/861.02 |
| 6,230,103 B1 | 5/2001 | DeCorso et al. | 702/23 |
| 2002/0108451 A1 | 8/2002 | May et al. | 73/861.63 |

\* cited by examiner

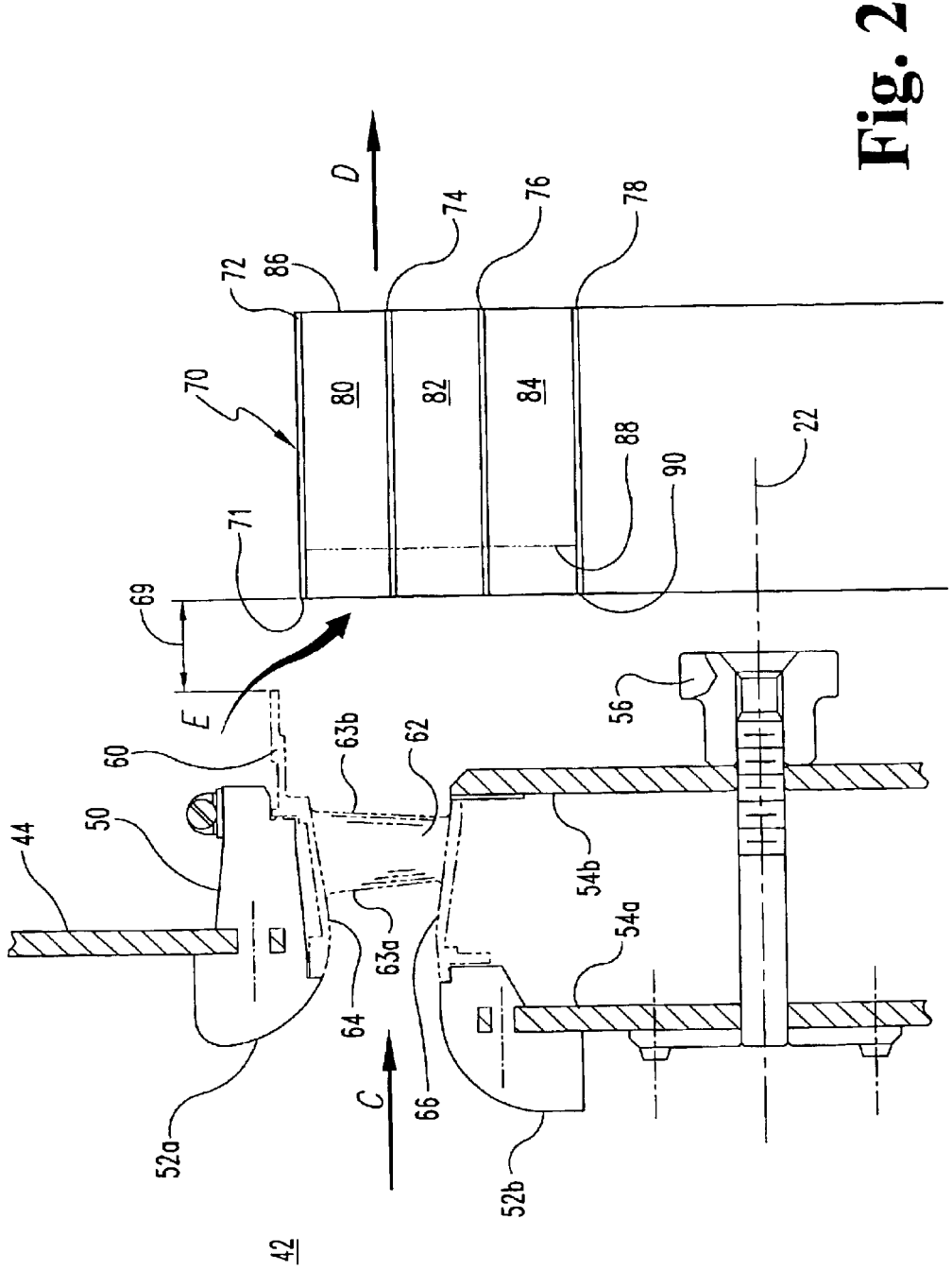

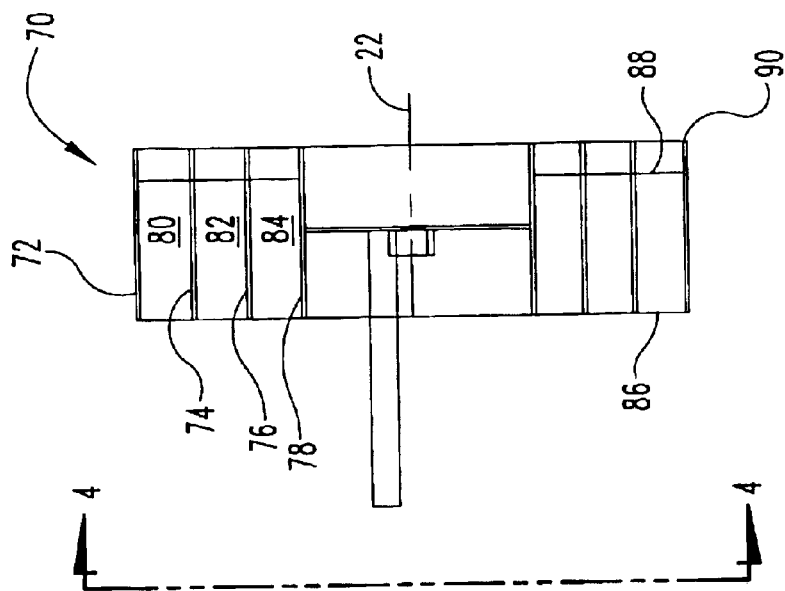
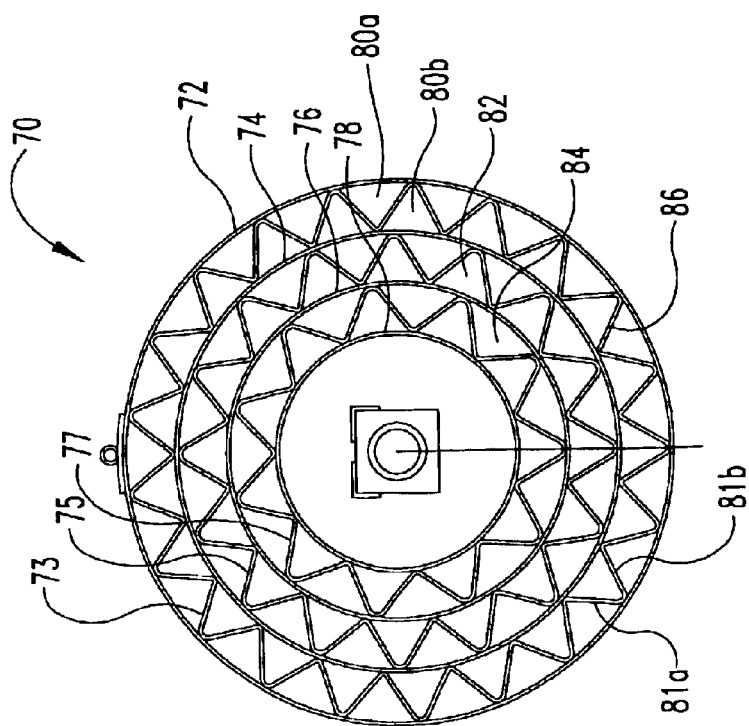

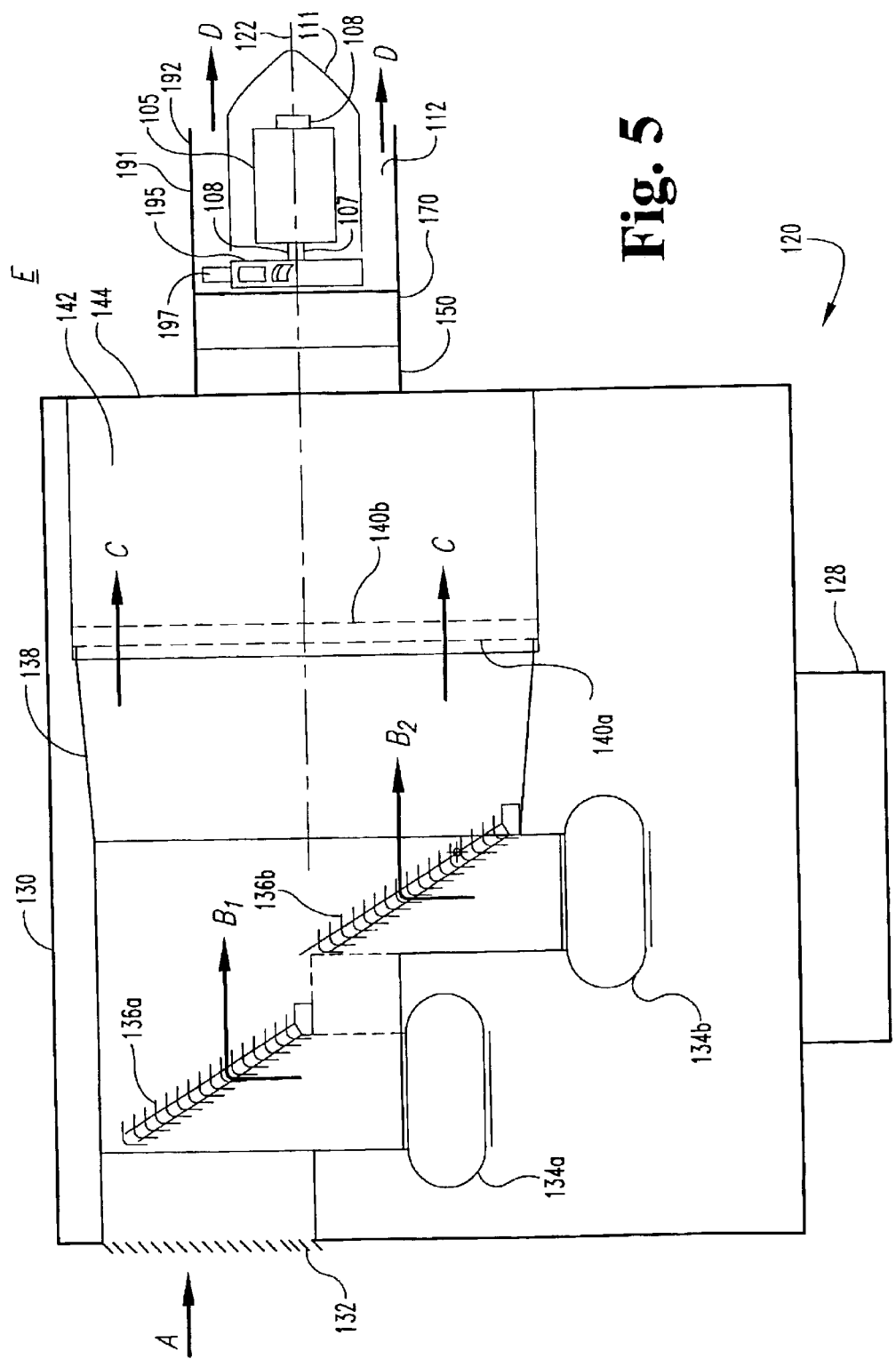

FLOW VECTOR ANALYZER FOR FLOW BENCH

CROSS REFERENCE TO RELATED APPLICATIONS

The present invention claims the benefit of priority to U.S. Provisional Patent Application Ser. No. 60/367,972, filed Mar. 26, 2002; and U.S. Provisional Patent Application Ser. No. 60/426,960, filed Nov. 15, 2002, both of which are incorporated herein by reference.

FIELD OF THE INVENTION

The present invention relates to improved apparatus and methods for airflow testing, and more particularly to measurement of airflow characteristics of a gas path component of a gas turbine engine.

BACKGROUND OF THE INVENTION

Devices such as natural gas compressors, air compressors, steam turbines, and gas turbines, include various internal components, such as vanes, stators, blades, diffusers, housings, and combustors though which quantities of air, natural gas, steam, or combusted gas flow. It is important to the proper operation of these devices that these internal components modify the internal flow in the correct way. These modifications include changing the average properties of the flowing medium (such as pressure, temperature, density, velocity, etc.) and/or the profiles and gradients of these properties.

These internal components are designed to change the properties of the flowing medium within the context of the device, i.e., change the properties in respect to internal devices either upstream or downstream of the particular component. For example, the first stage turbine vane of a gas turbine engine receives combusted air from a combustor and provides the combusted air to turbine blades located downstream.

This interaction between internal components is often a function of the radial and circumferential extent of the component's flow path. For example, a turbine vane includes a portion of a flow path near the hub (inner most lower wall) of the vane and the outer diameter (outer most wall) of the vane. It is typical that components such as turbine vanes provide air in velocity and pressure gradients that change from the inner hub to the outer diameter. Further, these property gradients of the gas change circumferentially, i.e., the gradient closest to the trailing edge of the vane can be different than the gradients at a position in between adjacent trailing edges.

As vanes are manufactured, there are times when the trailing edge of the vane is bent manually. Further, it is possible that the trailing edge of the vane, or other geometrical aspects of the vane, is altered as a result of long-term usage. In either of these situations, the gas property gradients from the exit of the vane are altered. However, there may not be suitable test equipment for characterizing the modified gradients. One simple attempt to provide such information involves the use of a protractor with a single inner foil rotatably coupled to the protractor. As air from a tested component flows across this assembly, the angle of the airfoil changes, similar in operation to a weather vane.

What is needed is an improvement in airflow testing that improves the accuracy with which the flow characteristics of the component are determined. The present invention does this in a novel and nonobvious manner.

SUMMARY OF THE INVENTION

The present invention relates to various apparatus and methods for airflow testing of a component of a gas turbine engine.

One embodiment of the present invention includes an apparatus for flow testing of gas through a component. The apparatus includes a test bench including a source of flowing gas and configured to mount the component proximate to the aperture. The apparatus includes a measurement section with an arc-shaped inner flowpath and an arc-shaped outer flowpath for receiving therebetween the gas exiting the component. The measurement section including a measurement device between the inner flowpath and the outer flowpath that is being rotatable about a centerline.

Another embodiment of the present invention includes an apparatus for flow testing of gas through a component. The apparatus includes a test bench including a source of flowing gas and a housing adapted and configured to mount the component proximate to the aperture. The apparatus includes a measurement section located downstream of and proximate to the aperture including at least two circumferentially spaced-apart measurement devices each providing a signal in response to the flow of gas proximate thereto, and each measurement device having a different length in the radial direction.

Another embodiment of the present invention includes an apparatus for flow testing of gas through a component. The apparatus includes means for simultaneously measuring properties of the gas exiting from the component at a plurality of radial locations and a plurality of circumferential locations, said measuring means being rotatable transverse to the flowpath of the component.

Another embodiment of the present invention includes a method for evaluating a gasflow characteristic of a gaspath component for a gas turbine engine. The method includes mounting the component, placing a measurement device at a first location downstream of the component; making a first measurement of a property of the gas with the measurement device placed at the first location, moving the measurement device to a second location downstream of the component; and making a second measurement of a property of the gas with the measurement device placed at the second location;

Another embodiment of the present invention includes a method for evaluating a gasflow characteristic of a gaspath component for a gas turbine engine. The method includes mounting the component in a first flow direction, directing a flow of the gas into the component, making a first measurement of a property of the gas with the component mounted in the first flow direction, mounting the component in a second flow direction to the support member, the second flow direction being opposite of the first direction; and making a second measurement of a property of the gas with the component mounted in the second flow direction.

Yet other aspects of the present invention will be apparent from the description of the preferred embodiment, the drawings, and the claims to follow.

DESCRIPTION OF THE DRAWINGS

FIG. 2 is a partial cutaway view of a portion of the apparatus of FIG. 1.

FIG. 3 is a side elevational view of an apparatus according to one embodiment of the present invention.

FIG. 4 is an end elevational view of the apparatus of FIG. 3 as taken along line 4—4 of FIG. 3.

FIG. 5 is a schematic representation of an airflow measurement system according to another embodiment of the present invention.

DESCRIPTION OF THE PREFERRED EMBODIMENT

Figure 1:
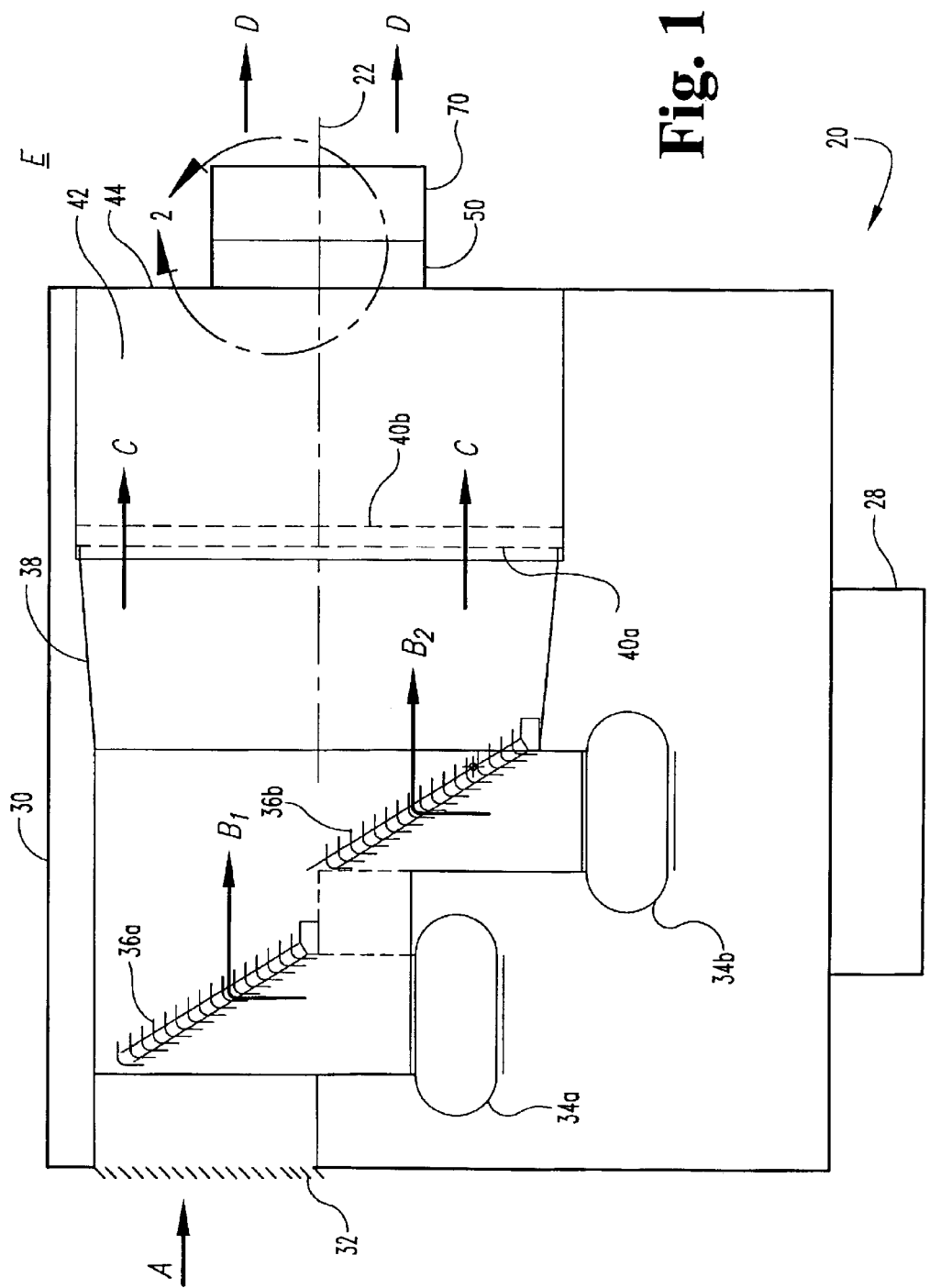
FIG. 1 is a schematic representation of an airflow measurement system according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to improved apparatus and methods for measurement of airflow through a component, such as a vane or other gaspath component of a gas turbine engine. In one embodiment, the present invention includes various devices and methods for directing air into the component to be tested, and also various devices and methods for directing the flow of air exiting from the tested component.

In one embodiment, the present invention uses one or more air blowers to act as a source of air into a plenum chamber. Preferably, there are a plurality of devices for directing the path of the air, such as turning vanes, that accept air from the source and provide it in a predetermined pattern to a plenum. In some embodiments, the entrance to the plenum chamber may include another flow manipulation device such as one or more sheets of perforated metal. Attached at one end of the plenum chamber and preferably along a centerline of the chamber, is a component such as an engine component for which it is desired to measure the airflow characteristics. Air flowing from the source through the vanes and perforated metal into the plenum chamber is presented to the inlet of the component in a predetermined flow pattern. Air flows from the plenum chamber through the tested component and into another flow directing member. The flow directing member includes a plurality of flow directing devices, such as concentric rings, flow-through cells and the like, and finally into room ambient conditions. By controlling the conditions of the test, such as the speed of the air blowers, the airflow provided to the main plenum, the pressure and temperature of the air in the main plenum, various flow characteristics of the test component can be determined.

The present invention includes the discovery that placement of a flow directing or stabilizing member proximate to the exit of the tested component improves the accuracy, reliability, and repeatability of the measurements that pertain to the test component. Although the phenomenon may not be completely understood, it is believed that this improvement is due, at least in part, to the stabilization of air flowing over the tested component along with a reduction in the recirculation of air exiting the tested component.

FIG. 1 schematically represents a system 20 for airflow testing of a component. System 20 includes a test bench 30 which includes an electronic controller 28 for control of test bench 30 as well as measurement of various parameters. Located along centerline 22 of test bench 30 are a test assembly 50 and an exit flow-stabilizing member 70. As will be explained, air flows generally from ambient conditions as indicated by arrow A into test bench 30. This air is directed and combined with other sources of air as indicated by arrows B1 and B2. In one embodiment of the present invention, the air is further manipulated and provided in a predetermined airflow pattern C. The air C flows through the test assembly and flow stabilizing member back into ambient conditions as indicated by arrows D.

In one embodiment, test bench 30 includes an air inlet 32 for providing ambient air into a flow path of the test chamber. This incoming air, indicated by arrow A, mixes with air provided form a source of air which preferably includes multiple air blowers 34a and 34b. Air blowers 34a and 34b provide air into turning vanes 36a and 36b, respectively, which direct air from these sources toward the component to be tested. Airflow B1 and airflow B2 are provided in one embodiment to a transition duct 38 which changes its cross-sectional shape from square to round. Air exiting the round opening of duct 38 preferably flows through a plurality of perforated metal screens 40a and 40b into a round plenum chamber 42. Air flowing into chamber 42 flows in a predetermined pattern chosen to provide accurate and repeatable testing of testing assembly 50.

Referring to FIGS. 1 and 2, testing assembly 50 includes one or more components 60, such as one or more vanes or other air foil shapes from a gas turbine engine. However, the present invention contemplates the air flow testing of any device which is adapted and configured to provide predetermined flow characteristics such as a particular air flow at a particular component pressure drop.

Testing assembly 50 is preferably coupled to an end 44 of chamber 42. As best seen in FIG. 2, test assembly 50 includes upper and lower flow path transition pieces 52a and 52b, respectively, which are mounted along the upper gas path walls 64 and 66, respectively, of component 60. Upper and lower flow path pieces 52a and 52b provide smooth and predetermined characteristics for airflow C provided from plenum 42. In some embodiments, transitions pieces 52a and 52b simulate the shape and/or characteristics of other gaspath components of the gas turbine engine that are proximate to component 60.

Component 60 is mounted in compression between a pair of coupling plates 54a and 54b. A screw assembly 56 maintains plates 54a and 54b in compression against leading and trailing edges of component 60. A compression member (not shown) clamps a testing assembly 50 to end 44 of plenum chamber 42 along centerline 22.

As best seen in FIG. 2, a flow-stabilizing member 70 is located proximate to the aft end 68 of component 60. In some embodiments of the present invention, there is a gap 69 between the forward most edge 71 of member 70 and the aft most edge 68 of component 60. In some embodiments of the present invention and under certain flow conditions, it has been found that having a gap 69 of about one inch provides good repeatability of the measurements of the airflow characteristics of component 60. This additional entrained is shown by arrows E. However, the present invention also contemplates those embodiments in which there is no gap 69, and air flowing along the upper surface of component 60 exits directly into flow stabilizing member 70.

Referring to FIGS. 2, 3, and 4, one embodiment of the present invention includes a flow stabilizing member 70 which includes a plurality of concentric rings 72, 74, 76, and 78. In one embodiment of the present invention, the radial distance between adjacent rings is approximately equal. However, the present invention contemplates any spacing between adjacent rings.

As best seen in FIG. 4, located between adjacent rings are convoluted members 73, 75, and 77. As one example, convoluted member 73 includes a plurality of folded sections 81a and 81b in a "saw tooth" pattern. Convoluted member 73 is formed into a round shape, and inserted between rings 72 and 74. Likewise, convoluted members 75 and 77 are inserted between respective rings. The folds 81a and 81b of member 73 form a plurality of cells 80a and 80b between rings 72 and 74. In one embodiment of the present invention, each cell includes three substantially parallel walls that direct airflow therethrough in a predetermined pattern. For example, a cell 80a is formed between a wall 81a, a wall 81b, and a portion of ring 72, which provide a flow-through passageway for air exiting the tested component 60. Likewise, an alternate cell 80b is formed between a wall 81a, a wall 81b, and a portion of ring 74, which also provide a flow-through passageway for air exiting the tested component 60. Therefore, air exiting test component 60 flows through a plurality of three-sided cells. It is believed that the airflow straightening provided by these cells provides a stabilizing influence upstream to component 60, such as to either the pressure side or suction side of the air foil of vane 62, anywhere from its leading edge 63a to its trailing edge 63b. Referring to FIG. 2, air exiting component 60 can flow into any of a plurality of cells 80, 82, or 84. Note that as flow stabilizing member 70 is brought closer to component 60 (such that gap 69 diminishes), less air is carried through cells 84 between rings 76 and 78. Although what has been shown and described is a three-sided cell where the three cell walls are parallel, the present invention contemplates other configurations of multi-walled cells, including, as non-limiting examples, square and hexagonal honeycomb cells.

Referring to FIGS. 2 and 3, an arrangement of cells and rings according to one embodiment of the present invention can be seen. Rings 72, 74, 76, and 78 preferably have leading edges 90, which lie in a common plane. Convoluted members 73, 75, and 77 have a leading edge 88 that preferably lie in a common plane. The leading edge 88 of the convoluted members, and therefore also the leading edge of the cells, is preferably spaced aft of the leading edge 90 of the rings by about one-half inch. Further, the trailing edges of the convoluted edges and also the trailing edges of the concentric rings lie in a common plane 86. However, the present invention also contemplates those embodiments in which none of the trailing edges of cells 80, 82, or 84 lie in a common plane, nor do the trailing edges of the retaining rings 72, 74, 76 or 78. Further, the present invention also contemplates those embodiments in which the various leading edges of the rings and convoluted members are not offset from one another. Additionally, the present invention contemplates those embodiments in which none of the leading edges of the concentric or the convoluted members share a common plane.

In one embodiment of the present invention, there is an apparatus for airflow testing of a component. The apparatus includes a test bench including a source of air, a plenum, and at least one member for directing air from the source into said plenum. The apparatus includes a component receiving air from the plenum, the air flowing through the component. The apparatus includes a flow stabilizing member located proximate to the component and receiving air from the component, the flow stabilizing member including a plurality of open cells, each cell having a plurality of parallel walls for passage of a portion of the air from the plenum therebetween.

In another embodiment of the present invention, there is an apparatus with a source of air. The apparatus includes a component adapted and configured for redirection of air passing therethrough. The apparatus includes a means for directing air from the source to the component and means for redirecting air received from the component, the redirecting means including a plurality of multiwalled, flow-through passages for receiving and redirecting air exiting from the component.

In still another embodiment of the present invention, there is a method for testing the airflow characteristics of a gaspath component for a gas turbine engine. The method includes providing a source of air, a plenum chamber with two ends, a gas turbine gaspath component to be tested, and a plurality of cells defining flow-through passageways. The method includes directing the air from the source into one end of the plenum chamber, mounting the component at another end of the chamber, flowing the air through the chamber to the component, flowing the air through the component, and directing the air exiting the component through the passageways.

Yet another embodiment of the present invention concerns systems, apparatus, and methods for measurement of airflow through a component, such as a vane or other gas path component of a gas turbine engine. In one embodiment, the present invention includes various devices and methods for directing air into the component to be tested, and also various devices and methods for measuring various characteristics of the gas exiting from the tested component.

In one embodiment, the present invention uses one or more of the various air blowers, plenum chambers, turning vanes, air conditioning equipment, and control devices described previously herein. By controlling the conditions of the airflow test, such as the speed of the blowers, the direction of the airflow, and/or the pressure and temperature of the air, various flow characteristics of the test component can be determined.

Some embodiments of the present invention have been developed from the understanding that the characteristics of gas flowing through an airflow component such as a turbine nozzle depend upon a variety of characteristics of the nozzle.

Figure 7:
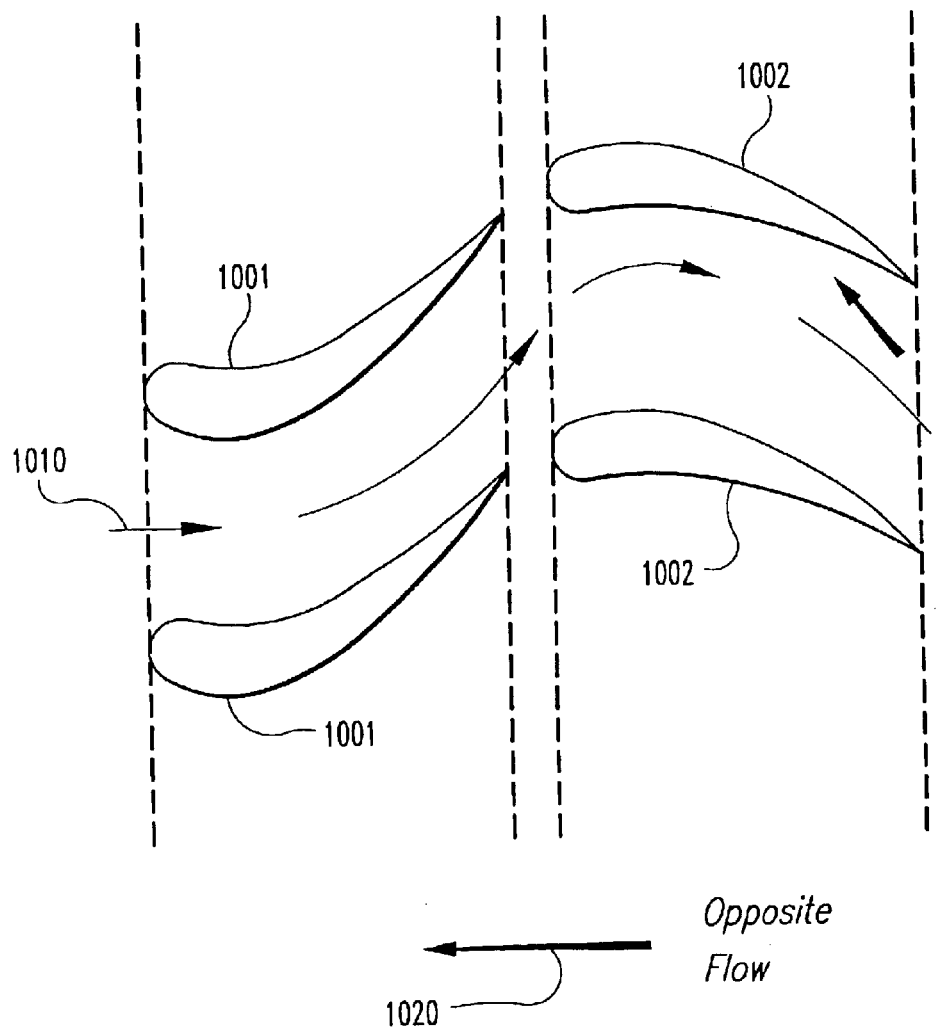
FIG. 7 is a schematic end view of a pair of turbine vanes providing gas flow to a pair of downstream blades.

FIG. 7 is a schematic representation of gas flowing between a pair of turbine vanes 1001, also known as a turbine nozzle, and onto the blades 1002 of a rotating turbine wheel. The air exiting the turbine vanes change both velocity and direction. The velocity of the air increases because the distance between the turbine vanes acts as a converging nozzle, and also since the gas flow is subsonic. Further, the vanes have a curved shape that changes the direction of air such that the air exiting the trailing edge of the turbine nozzle is directed at the high pressure side of the turbine blades in the next stage of the engine.

The flow characteristics of adjacent rows of vanes and blades are carefully matched. However, the actual flow characteristics of a set of turbine vanes can vary considerably from the desired flow characteristics for various reasons, including manufacturing difficulties, inaccurate inspection and measurement techniques, wear and erosion during operation, and inaccurate or inconsistent repair techniques. For any of these reasons the actual throat of a pair of adjacent vanes can vary from desired values. Further, the characteristics of the vane trailing edge, including length, thickness, and angle can vary.

Compounding these problems are inaccuracies in the measurement of flow characteristics in a test rig. It is desirable to determine vane flow characteristics on test rig, prior to installation in an engine. In some applications, the vanes may be altered during airflow testing so as to achieve a desired airflow characteristic. However, it has been observed that altering a set of vanes to achieve a flow characteristic as measured on a test bench is not necessarily a good predictor of the performance of those same vanes when installed in an engine. Because of these test uncertainties, it is possible that a particular set of vanes may be repeatedly bench tested, altered, and engine tested until a successful engine test is performed.

It is believed that one reason for the discrepancy between bench testing and engine testing, and further between different bench tests, is because of the angle and relative turbulence of the air exiting from the trailing edge of the vane. For example, in vanes that have thick trailing edges as a result of repair procedures, there can be excessive turbulence as the air leaves the vane airfoil shape. Further, the trailing edge of the vane may be bent at the wrong angle, either as a result of manufacturing difficulties, handling, or salvage and repair procedures, such that the air exits at the wrong angle. Further, it is possible that flow separation will occur along the low pressure side of the vane if the trailing edge has been excessively bent. In addition, it is possible that the vane throat and/or trailing edge configuration may vary radially. For example, if the trailing edge of a vane has been manually bent; then it is possible that the greatest amount of bending occurred at a point midway between the inner radius hub and the outer radius shroud of the vane. Therefore, the airflow exiting at a point midway along the span of the vane can have a different exit angle than the airflow exiting near the hub of the vane.

The present invention includes apparatus and methods for more accurately determining the characteristics of airflow exiting a set of vanes. In one embodiment, the present invention includes a measurement section preferably located downstream of the airflow component being tested. This measurement section includes one or more devices or sensors which provide a signal corresponding to the airflow flowing in the vicinity of the device or sensor. Further, these sensors may be positioned at various radial locations so as to quantify flow characteristics of the air exiting the vanes at the corresponding radial distance.

In yet another embodiment of the present invention, the component to be tested is tested with air flowing in both the forward 1010 and reverse 1020 directions. For example, a first test is performed with air flowing through the tested component in the typical fashion (such as that shown in FIG. 7 for the turbine nozzle). From this first test, a flow characteristic, such as the vane area, vane angle, or other parameter is determined. Following this first test, the same component is mounted for reverse flow, preferably using the same flow bench as the first test, although some different adapting fixtures may be necessary. In the second test, air is flowed through the component in the direction opposite to the typical and expected direction of flow, as indicated by the opposite direction arrow 1020 of FIG. 7. Following this second test, one or more flow parameters are determined, which can be the same as the flow parameter determined during the first test, or a different parameter altogether. The method preferably includes comparing the first flow characteristic to the second flow characteristic in mathematical fashion, such as by cross plotting, forming a ratio, a multiple, a difference, or other mathematical relationship. This calculated parameter is then used to determine whether of not the tested airflow component is acceptable or not.

The use of a one-hundred series prefix (1XX) with an element number (XX) refers to an element that is the same an the non-prefixed element (XX) previously described or depicted, except for the differences which are described or depicted hereafter.

FIG. 5 schematically represents a system 120 for airflow testing of a component, such as one or more arc-shaped turbine vane segments. Air flows generally from ambient conditions as indicated by arrow A into test bench 130, and is directed, combined, manipulated, and flows back to ambient as indicated by arrows B, C, and D.

In one embodiment, test bench 130 includes a testing assembly 150 that includes one or more components 160, such as one or more turbine vanes, compressor stators, diffuser stators, other airfoil shaped, or other airflow components, including but not limited to those from a gas turbine engine. However, the present invention contemplates the airflow testing of any device which is adapted and configured to provide predetermined flow characteristics such as a particular airflow at a particular component pressure drop, a particular air exit angle, a particular air velocity, air temperature, and/or combinations of these characteristics, including variations in these characteristics as a function of radial, angular, and axial location.

Component 160 (not shown) is mounted within testing assembly 150 in any manner. Preferably, the manner of mounting component 160 provides for the placement of a closely located measurement section 191 adjacent and downstream of component 160. In some embodiments of the present invention, component 160 is mounted with interstage seals, manifolds, brackets, and/or shrouds 170 which are also adjacent the test component 160 when it is installed in its typical operating apparatus. However, the present invention also contemplates those embodiments in which specially designed flow straighteners, mixers, seals, airflow paths, and other apparatus are installed upstream and/or downstream of test component 160.

Referring to FIG. 5, system 120 includes a measurement section 191 preferably located downstream of test component 160. In one embodiment, measurement section 191 includes an outer shroud 192 for generally controlling the flow of air exiting from test component 160. Measurement section 191 further includes a measurement assembly 195 which is preferably rotatable about 360 degrees. In one embodiment, rotation of measurement assembly 195 is provided by an electric motor 105 coupled to measurement assembly 195 by a coupling 106. In some embodiments of the present invention, coupling 106 is a viscoelastic coupling incorporating dampening. In yet other embodiments of the present invention, coupling 106 is a solid coupling. Motor 105 is housed within a motor shroud 111, shroud 111 providing the inner walls of the flow path for air flowing through measurement section 191. In some embodiments, the flow annulus between inner shroud 111 and outer shroud 192 includes one or more vanes for changing the direction of air exiting measurement section 191.

Figure 6:
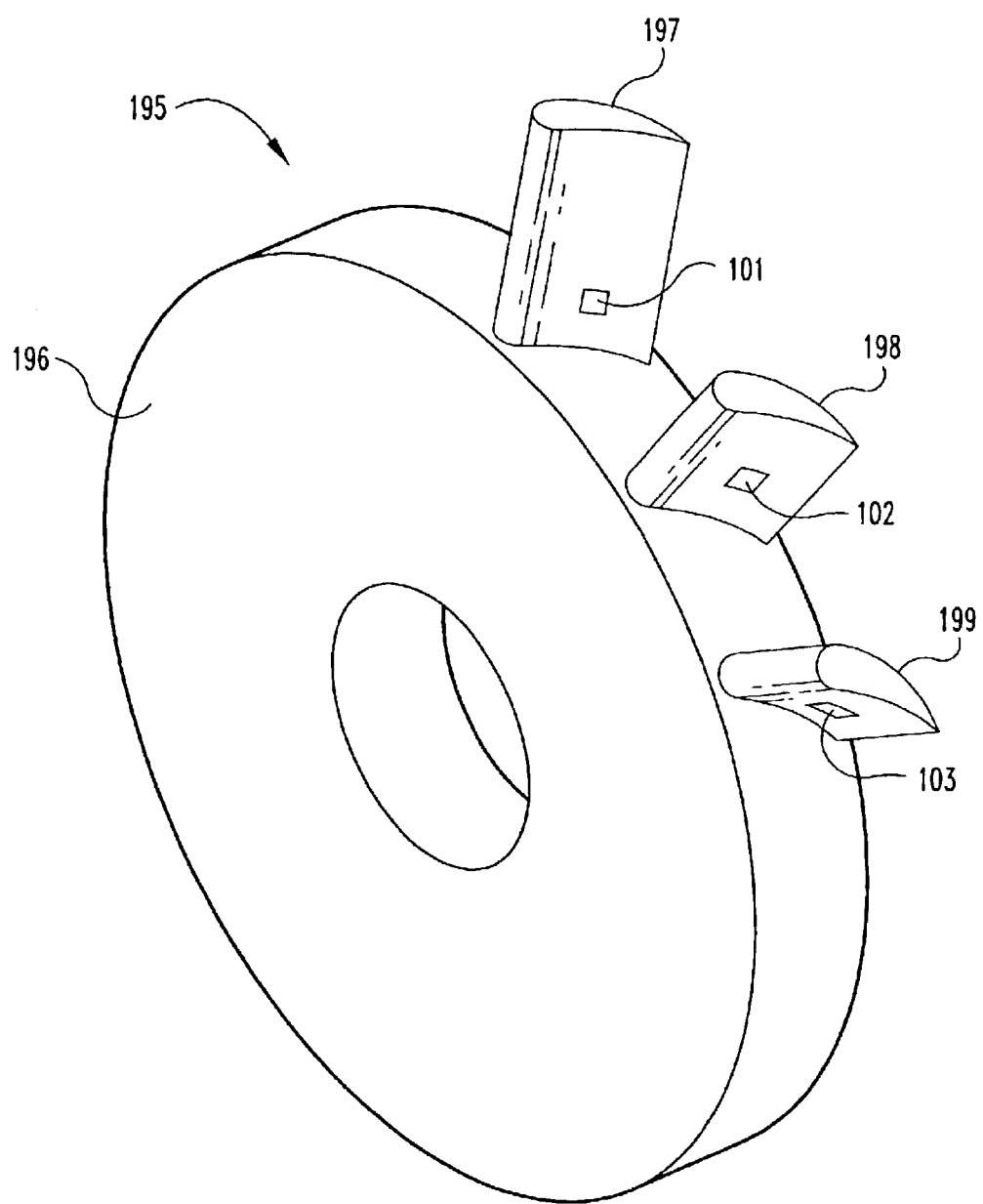
FIG. 6 is a perspective schematic representation of an airflow measurement device according to one embodiment of the present invention.

In one embodiment of the present invention, airflow exiting from test component 160 passes around one or more airflow devices, with one or more of these devices incorporating a sensor. FIG. 6 is a schematic representation of a measurement section 195 according to one embodiment of the present invention. Measurement section 195 includes a wheel 196 with three airfoil-shaped measurement devices 197, 198, and 199. Each measurement device 197, 198, and 199 extends a different radial distance from the outer surface (inner hub) of wheel 196. As installed in system 120, measurement device 197 extends across the entire radial length of the flow path, which can coincide with the radial length of the turbine vane being tested. Measurement device 198 extends across only a portion of the span from the flow path inner diameter to the flow path outer diameter. Measurement device 199 also extends across only a portion of the distance from the flow path inner diameter to the flow path outer diameter and preferably is of a shorter radial length than measurement device 198. Although what has been described and depicted are measurement devices 197, 198, and 199 that are airfoil shaped like a turbine blade, the present invention also contemplates those embodiments in which devices 197, 198, and 199 are different length rods, plates, or other shapes. Further, although the present invention shows these measurement devices places adjacent one another, the present invention also contemplates those embodiments in which the devices are spaced apart from each other along the circumference of wheel 196. Further, the present invention contemplates those embodiments in which each of the measurement devices has the same radial extent from hub to outer diameter.

As best seen in FIG. 6, each measurement device 197, 198, and 199 preferably includes a corresponding sensor 101, 102, and 103, respectively. In one embodiment, sensors 101, 102, and 103 are strain gauges which measure the bending strain of the measurement device to which it is attached. However, the present invention also contemplates those embodiments in which the measurement devices are accelerometers, hot-wire anemometers, pressure taps with corresponding pressure transducers, or any other sensor which can detect the response of measurement device 197, 198, or 199 to the gas flow exiting from component 160, or which can respond directly to the gas flow itself. As one example, measurement assembly 195 may include one or more measurement devices which include an array of pressure taps, arranged, for example, around and along the leading edge of the measurement device. Further, the sensor maybe mounted directly on the surface of the measurement device, as can be the case with a strain gauge. As another example, the device may be hollow and incorporating an accelerometer located internally. Further, the measurement device can include one or more flow passages with an entrance on one surface of the measurement device (such as the leading edge), and an exit on another surface of the measurement device (such as the trailing edge). Located within this flow passageway can be a sensor such as a hot-wire anemometer. In yet anther embodiment of the present invention, the measurement device includes a controlled source of heat and a thermocouple. The signal from the thermal couple changes in accordance with the control of the flow of heat and also with the amount of air flowing through the passageway.

During operation, the system operator uses motor 105 to rotate measurement assembly 195 through a 360 degree arc, or in some embodiments, a lesser arc. In so doing, the measurement devices 197, 198, and 199 react to the impingement of airflow received from the upstream test component 160. For assembly 195 depicted in FIG. 6, measurement device 197 exhibits a response that is influenced by air exiting from a portion of the test component at all radial locations. In contrast, measurement device 199 is more heavily influenced by air exiting from a portion of the hub of component 160, and is less influenced by air exiting near the outer diameter of component 160. Measurement device 198 is influenced in a manner intermediate of devices 197 and 199.

An angular resolver 108 is coupled to the shaft of motor 105, and provides an electrical signal corresponding to the angular location of measurement devices 197, 198, and 199. The signals from the sensors 101, 102, and 103 are provided to a system data controller (not shown) which, combined with the signal from resolver 108, can plot the circumferential variation of the sensor as it traverses completely around the flow path of the test component 160.

By cross plotting the angular orientation of test assembly 195 with the reading from the sensors 101, 102, and 103, the resulting circular plot can indicate areas of low strain (or other measured parameter), which correspond to areas of low airflow. Further, the width of the various peaks and valleys of the circular plot correspond to various characteristics of the tested component, including width of the throat and exit angle from the component trailing edge. In addition, comparison of the circular plots from sensor 101 and 103 indicate radial differences in air flowing between a pair of particular vanes.

In yet another embodiment of the present invention, measurement section 191 includes a load cell 107 located between motor 105 and rotating measurement assembly 195. As air strikes one or more measurement device, a torque results on the shaft connecting motor 105 and wheel 196. This torque can be cross plotted with the angular position measured by resolver 108 to produce a circular plot showing torque as a function of angular position, which is indicative of airflow and/or flow angle from a corresponding position of the test component 160.

In yet another embodiment of the present invention, any of the heretofore described tests and measurements are performed with component 160 installed to receive air in a typical fashion, and then repeated with component 160 mounted in reverse manner so as to receive flow in a reverse direction. The present invention contemplates embodiments for forward and reverse airflow testing both with and without a measurement section. For those embodiments not including a measurement section 191, it is possible to determine overall flow characteristics of the test component. For example, it is expected that the calculated flow area for a turbine nozzle in the reverse direction, divided by the flow area for the same turbine nozzle in the forward direction can be a ratio less than one. Based on design parameters of the particular gas turbine engine, and also engine test measurements, acceptable numbers for this area ratio can be established. For those applications in which a compressor diffuser is the test component, it is expected that the forward-measured area divided by the reverse-flow measured area can be a ratio less than one.

For those embodiments including a measurement section 191, the circular plots for forward-flowing air and reverse-flowing air can be compared. Based on the comparison of forward and reverse flowing installations, ranges of acceptable values can be established for the tested component. Note that the present invention contemplates any type of data comparison; any data taken from the forward-flowing test can be compared to the data taken from the reverse-flowing test, including but not limited to logarithmic comparisons, frequency comparison, ratios, differences, and temperature and pressure comparisons.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for flow testing of gas through an arc-shaped component, comprising:
   a test bench including a source of flowing gas and a housing defining a plenum chamber and an aperture for flowing of the gas into the component, said housing being adapted and configured to mount the component proximate to the aperture; and
   a measurement section located downstream of and proximate to the aperture, said measurement section including an arc-shaped inner flowpath and an arc-shaped outer flowpath for receiving therebetween the gas exiting the component, said measurement section including a measurement device between the inner flowpath and the outer flowpath, said measurement device providing a signal in response to the flow of gas proximate thereto, said measurement device being rotatable about the centerline of the arc of the component.

2. The apparatus of claim 1 wherein said measurement section includes a platform with a plurality of measurement devices each located between the inner flowpath and the outer flowpath, said platform being rotatable about the centerline.

3. The apparatus of claim 1 wherein said measurement section includes a plurality of measurement devices, each measurement device has a length in the radial direction between the inner flowpath and the outer flowpath, and each length is different.

4. The apparatus of claim 3 wherein each measurement device includes a sensor, and the sensor is one of a strain gage, pressure transducer, accelerometer, anemometer including a wire, or piezoresistive element.

5. The apparatus of claim 4 wherein at least one of said measurement devices is in the shape of an airfoil.

6. The apparatus of claim 1 wherein said apparatus includes as the component an arc-shaped vane for a gas turbine engine.

7. The apparatus of claim 6 wherein said measurement device includes a sensor for measuring the angular position of said measurement device relative to the component.

8. The apparatus of claim 1 which further comprises a sensor producing a signal corresponding to the torque imparted by the airflow onto said measurement device.

9. The apparatus of claim 1 wherein said measurement device is in the shape of an airfoil.

10. The apparatus of claim 1 wherein said measurement device is in the shape of a plate.

11. The apparatus of claim 1 wherein said measurement device is in the shape of a rod.

12. The apparatus of claim 1 wherein said measurement section includes a plurality of measurement devices.

13. The apparatus of claim 12 wherein each said measurement device includes a sensor producing a signal corresponding to the torque imparted by the airflow onto said measurement device.

14. The apparatus of claim 13 wherein at least one of said measurement devices is in the shape of an airfoil.

15. The apparatus of claim 1 wherein said housing is adapted and configured for mounting a vane for a gas turbine engine.

16. The apparatus of claim 15 wherein the gas flowing through said measurement section exits said measurement section by flowing into ambient conditions.

17. The apparatus of claim 1 wherein the gas flowing through said measurement section exits said measurement section by flowing into ambient conditions.

18. An apparatus for flow testing of gas through a component, comprising:
   a test bench including a source of flowing gas and a housing defining a plenum chamber and an aperture for flowing of the gas into the component, said housing being adapted and configured to mount the component proximate to the aperture; and
   a measurement section located downstream of and proximate to the aperture, said measurement section including an inner flowpath and an outer flowpath for receiving therebetween the gas exiting the component, said measurement section including at least two circumferentially spaced-apart measurement devices each located between the inner flowpath and the outer flowpath, each said measurement device providing a signal in response to the flow of gas proximate thereto, each measurement device having a length in the radial direction between the inner flowpath and the outer flowpath, and each length being different.

19. The apparatus of claim 18 wherein each said measurement device is in the shape of an airfoil.

20. The apparatus of claim 18 wherein each said measurement device is in the shape of a plate.

21. The apparatus of claim 18 wherein each said measurement device is in the shape of a rod.

22. The apparatus of claim 18 wherein the component is arc-shaped and said measurement section is rotatable across the arc.

23. The apparatus of claim 22 wherein said measurement section includes a sensor for measuring the angular position of said measurement device relative to the component.

24. The apparatus of claim 18 wherein at least one of said measurement devices includes a sensor, and the sensor is one of a strain gage, pressure transducer, accelerometer, anemometer including a wire, or piezoresistive element.

25. The apparatus of claim 18 wherein said housing is adapted and configured for mounting a vane for a gas turbine engine.

26. The apparatus of claim 25 wherein the gas flowing through said measurement section exits said measurement section by flowing into ambient conditions.

27. The apparatus of claim 18 wherein the gas flowing through said measurement section exits said measurement section by flowing into ambient conditions.

28. The apparatus of claim 18 which further comprises a sensor producing a signal corresponding to the torque imparted by the airflow onto said measurement device.

29. An apparatus for flow testing of gas through a component, comprising:
   a test bench including a source of flowing gas and a housing defining a plenum chamber and an aperture for flowing of the gas into the component, said housing being adapted and configured to mount the component proximate to the aperture; and
   means for simultaneously measuring properties of the gas exiting from the component at a plurality of radial locations and a plurality of circumferential locations, said measuring means being rotatable transverse to the flowpath of the component.

30. The apparatus of claim 29 wherein said measuring means includes a plurality of devices each adapted and configured to bend in response to the gas flowing out of the component and around the device.

31. The apparatus of claim 30 wherein at least one of said measurement devices is in the shape of an airfoil.

32. The apparatus of claim 30 wherein at least one of said measurement devices is in the shape of a plate.

33. The apparatus of claim 30 wherein at least one of said measurement devices is in the shape of a rod.

34. The apparatus of claim 30 wherein said measuring means includes a sensor producing a signal corresponding to the torque imparted by the airflow onto said measuring means.

35. The apparatus of claim 29 wherein said housing is adapted and configured for mounting a vane for a gas turbine engine.

36. The apparatus of claim 35 wherein the gas flowing through said measuring means exits said measuring means by flowing into ambient conditions.

37. The apparatus of claim 29 wherein the gas flowing through said measuring means exits said measuring means by flowing into ambient conditions.

38. The apparatus of claim 29 wherein the component is arc-shaped and said measurement section is rotatable across the arc.

39. The apparatus of claim 38 which further comprises a sensor for measuring the angular position of said measuring means relative to the component.

40. The apparatus of claim 29 wherein said measuring means includes a sensor, and the sensor is one of a strain gage, pressure transducer, accelerometer, anemometer including a wire, or piezoresistive element.

* * * * *

UNITED STATES PATENT AND TRADEMARK OFFICE
CERTIFICATE OF CORRECTION

PATENT NO. : 6,772,627 B2
DATED : August 10, 2004
INVENTOR(S) : Ronald J. Fleming It is certified that error appears in the above-identified patent and that said Letters Patent is hereby corrected as shown below:

Title page,
Item [56], References Cited, U.S. PATENT DOCUMENTS, please add the following:

| | | | |
|---|---|---|---|
| 3,552,202 | 1/1971 | Kroeger et al. | 73/147 |
| 3,782,189 | 1/1974 | Evans | 73/147 |
| 3,817,082 | 6/1974 | Fletcher et al. | 73/1.21 |
| 3,866,466 | 2/1975 | Cotter | 73/147 |
| 3,931,734 | 1/1976 | Dereng | 73/147 |
| 3,952,590 | 4/1976 | Howard et al. | 73/147 |
| 3,975,955 | 8/1976 | Dougherty et al. | 73/147 |
| 4,344,330 | 8/1982 | Renken et al. | 73/861.66 |
| 4,534,216 | 8/1985 | Fasano et al. | 73/147 |
| 4,602,514 | 7/1986 | Kurrle et al. | 73/861.66 |
| 4,770,031 | 9/1988 | Roth et al. | 73/147 |
| 4,912,973 | 4/1990 | Milewski et al. | 73/202 |
| 5,035,359 | 7/1991 | Yamada et al. | 239/502 |
| 5,405,106 | 4/1995 | Chintamani et al. | 244/23D |
| 5,435,175 | 7/1995 | Kramer et al. | 73/147 |
| 5,481,925 | 1/1996 | Woodbury | 73/861.66 |
| 5,495,754 | 3/1996 | Starr et al. | 73/147 |
| 6,155,111 | 12/2000 | Wickern et al. | 73/147 |
| 6,189,390 | 2/2001 | Platt | 73/861.66 |
| 6,237,426 | 5/2001 | Gryc et al. | 73/861.66 |
| 6,378,361 | 4/2002 | Larsen et al. | 73/147 |
| 6,470,740 | 10/2002 | Li | 73/147 |
| 6,487,918 | 12/2002 | DeAngelis | 73/861.66 |
| 6,694,808 | 2/2004 | Sawada et al. | 73/147 |
| 2003/0070479 | 4/2003 | Lacey | 73/147 |
| 2003/0089167 | 5/2003 | Markstaller et al. | 73/147 |

Signed and Sealed this

Eleventh Day of January, 2005

JON W. DUDAS
*Director of the United States Patent and Trademark Office*